United States Patent [19]

Wakamori et al.

[11] 4,332,507

[45] Jun. 1, 1982

[54] WATER LEVEL CONTROL SYSTEM FOR A RESERVOIR

[75] Inventors: Fumio Wakamori, Machida; Motohisa Funabashi, Kanagawa; Mamoru Kata; Takazo Hirano, both of Hitachi; Mikihiko Onari, Tokyo, all of Japan

[73] Assignee: Hitachi, Ltd., Tokyo, Japan

[21] Appl. No.: 98,234

[22] Filed: Nov. 28, 1979

[30] Foreign Application Priority Data

Dec. 6, 1978 [JP] Japan .............................. 53-149945

[51] Int. Cl.$^3$ .............................................. E02B 7/20
[52] U.S. Cl. .................................... 405/92; 137/386
[58] Field of Search ...................... 405/92, 93, 94, 96, 405/97; 73/313; 137/41, 386, 392, 395, 399, 409, 426

[56] References Cited

U.S. PATENT DOCUMENTS

| | | | |
|---|---|---|---|
| 2,667,748 | 2/1954 | Heath | 405/92 |
| 3,466,872 | 9/1969 | Shimizu | 405/96 |
| 3,532,956 | 10/1970 | Simon | 137/386 X |
| 4,036,023 | 7/1977 | Matsumoto et al. | 405/92 |
| 4,180,083 | 12/1979 | Miyaoka et al. | 137/386 X |

FOREIGN PATENT DOCUMENTS

52-36056 3/1977 Japan .................................. 405/92

Primary Examiner—David H. Corbin
Attorney, Agent, or Firm—Craig & Antonelli

[57] ABSTRACT

A water level control system for a reservoir includes steps of detecting water level, outflow rate and inflow rate of the reservoir detecting modified water level corresponding to the reservoir's content depending on the actual water level, the outflow rate and the inflow rate, and controlling the outflow rate of the reservoir in response to a deviation value between a set reference and the modified water level, thereby reducing the influence of undesirable water level fluctuation.

15 Claims, 9 Drawing Figures

WATER LEVEL CONTROL SYSTEM FOR A RESERVOIR

BACKGROUND OF THE INVENTION

The present invention relates to a water level control system for a reservoir.

In general, the apparatus for controlling the amount of water stored in the reservoir consists of a gate control apparatus which determines a desired discharging amount and a degree of opening the gate to materialize the desired discharging amount based upon a water level H measured by a water gauge which is installed near the discharge gate of the reservoir, such that a command for opening or closing the gate is supplied to a gate drive unit.

To maintain the stored amount of water and the water level at desired values, it is necessary to correctly detect the change of water level that is caused by the difference between the inflow rate and the outflow rate thereby to give a command of opening or closing the gate. However, the water gauge detects not only the change in water level caused by the difference between the inflow rate and the outflow rate but also detects transient fluctuation of the water level (hereinafter referred to as water-level noise) caused by the opening or closing of the gate or by the sudden change in the inflow rate. To cope with these problems, the conventional control system includes steps of detecting the water level by a water gauge after every predetermined period of time, and controlling the opening degree of the gate based upon the average value of the water level detected from a predetermined past moment through up to the present moment. Namely, the conventional control system relied upon a so-called running average method. With such a system, however, it was difficult to properly control the water level, overcoming the problem caused by the water-level noise. According to the above control system, therefore, when the inflow rate increased, the operation for controlling the opening degree of the gate often lagged behind proper time, and the degree of opening the gate tended to be greatly varied.

SUMMARY OF THE INVENTION

The present invention was accomplished not only to maintain the water level in the reservoir at a desired value but also to maintain the stored amount of water at a desired value. The object of the present invention, therefore, is to provide a control system which is capable of stably controlling the reservoir by distinguishing the change in water level caused by the difference between the inflow rate and outflow rate from the transient water-level noise, detecting the water level which does not contain water-level noise, and suppling the detected value to a gate control apparatus.

The feature of the present invention resides in that the water level corresponding to the stored amount of water in the reservoir is detected, and the actual water level is controlled depending upon the detected water level, wherein the level to be detected at a given moment (k) is detected by modifying a value detected from an estimated water level corresponding to the stored amount of water in the reservoir at a moment $(k-1)$ which is earlier than the moment (k) by a predetermined period of time, and from an inflow rate and an outflow rate at the moment $(k-1)$, with a difference between the above-mentioned detected value and the actual water level measured at the moment (k).

Here, the water level corresponding to the stored amount of water does not simply refer to "average" water level corresponding to the change in water level caused by fluctuation or noise, but refers to a water level (or the level of water which is always flat) which is determined only by the stored amount of water measured at an instantaneous moment in an equilibrium state without containing gradient in water level, fluctuation or noise.

DETAILED DESCRIPTION OF THE PREFERRED EMBODIMENT

Figure 1:
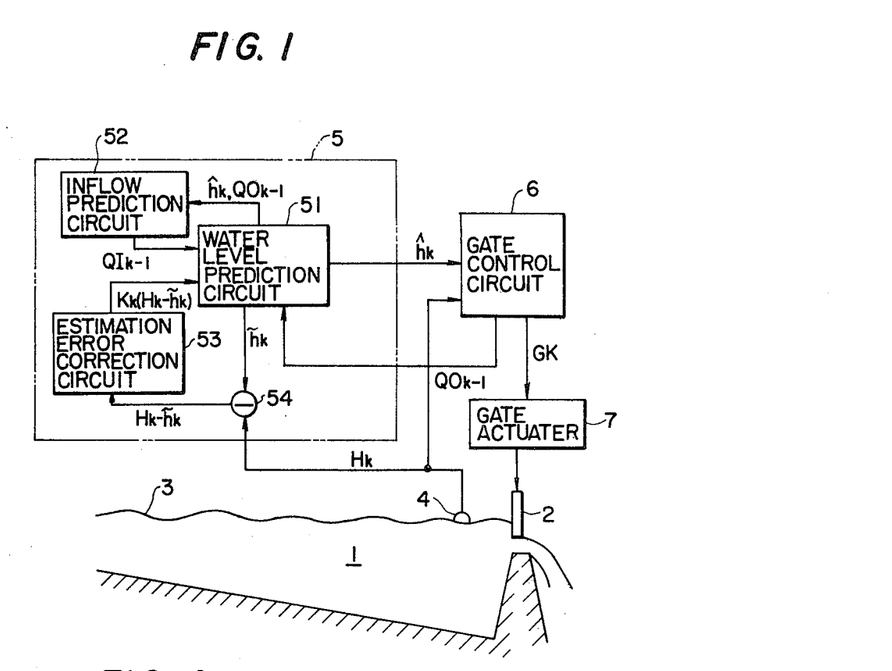
FIG. 1 is a diagram illustrating a whole setup of the system according to the present invention.

In FIG. 1, reference numeral 1 denotes a reservoir or a dam storing water which is discharged through a gate 2. Water level 3 of the stored water undergoes fluctuation due to various causes mentioned in the foregoing. Therefore, water level $H_k$ measured at a moment k by a water gauge 4 installed near the gate 2 always undergoes fluctuation with the passage of time; the fluctuation may contain various components. Reference numeral 5 denotes a filter which will be mentioned later in detail. The filter 5 works to distinguish water-level noise over the measured water level $H_k$ which contains various components, and produces an estimated value $\hat{h}_k$ of water level corresponding to the stored amount of water at the moment of measurement. Reference numeral 6 denotes a gate control circuit which calculates a discharge rate $QO_k$ based upon the estimated water level $\hat{h}_k$, detects a degree $G_k$ of opening the gate 2 for materializing the discharge rate $QO_k$, and supplies the thus detected value to a gate actuator 7. This gate 2 is opened or closed by the gate actuator 7. Here, the gate control circuit 6 has a circuit which causes the discharge rate $QO_k$ to be delayed by a time of one filtering operation as will be mentioned later. Therefore, the output to the circuit 51 is denoted by $QO_{k-1}$.

The filter 5 consists of a water level prediction circuit 51, an inflow prediction circuit 52 and an estimation error correction circuit 53. These circuits operate as mentioned below.

First, the water level prediction circuit 51 detects an estimated water level $\hat{h}$ corresponding to the stored amount of water based upon the inflow rate $QI_{k-1}$, outflow rate $QO_{k-1}$ and correction amount $K_k(H_k - \tilde{h}_k)$ in accordance with the below-mentioned equation. Here, $\tilde{h}_k$ represents $\hat{h}_{k-1} + 1/A(QI_{k-1} - QO_{k-1})\Delta T$, as will be mentioned later.

$$\hat{h}_k = \hat{h}_{k-1} + \frac{1}{A}(QI_{k-1} - QO_{k-1})\Delta T + \quad (1)$$

$$K_k \left[ H_k - \left\{ \hat{h}_{k-1} + \frac{1}{A}(QI_{k-1} - QO_{k-1})\Delta T \right\} \right]$$

where, $\hat{h}_k$: estimated water level corresponding to the stored amount of water at a moment k, A: water surface area of the reservoir, $QI_{k-1}$: inflow rate at a moment (k−1), $QO_{k-1}$: outflow rate at a moment (k−1), $\Delta T$: filtering interval (time interval from the moment k−1 to the moment k), $K_k$: estimated error correction gain at the moment k, $H_k$: actual water level at the moment k, As will be obvious from the equation (1) above, the water level prediction circuit 51 detects an fundamental estimated water level at the moment k from the relation of the first and second terms in equation (1), and modifies the above fundamental estimated water level with the value detected from the above fundamental estimated water level and the water level $H_k$ measured at that moment k, based upon the third term which corresponds to the output of the estimation error correction circuit 53.

When the outflow rate of the upstream reservoir of this reservoir is measured to be equal to the inflow rate to this reservoir, the inflow rate $QI_{k-1}$ of this reservoir may be predicted by the above outflow rate. When the inflow rate is not measurable, however, the value should be calculated by the inflow prediction circuit 52 in the following way as shown in FIG. 1. First, the instantaneous value $qi_{k-1}$ of the inflow rate at the moment (k−1) is given by the following relation.

$$qi_{k-1} = \Delta T^{-1}(\hat{h}_k - \hat{h}_{k-1})A + QO_{k-1} \quad (2)$$

Usually, the minimum unit for measuring the water level is 1 cm. With the unit smaller than 1 cm, the measurement is very difficult. Therefore, when the water surface area of the reservoir A is great, the value $qi$ should be smoothed so that the water level will not greatly vary. Hence, instantaneous inflow rates qi of the past m times of filtering moments are averaged.

$$\bar{qi}_{k-1} = \sum_{j=k-m}^{k-1} qi_j/m \quad (3)$$

Using the thus obtained vaue qi, it is possible to detect an estimated inflow rate $QI_k$ at the moment k in accordance with the following relation, $$QI_k = \bar{qi}_{k-1} + (\bar{qi}_{k-1} - \bar{qi}_{k-2}) \quad (4)$$

As will be obvious from the preceding equations (2) to (4), the estimated inflow rate $QI_k$ at the moment k is obtained after the estimated water level $\hat{h}_k$ up to the moment k is obtained. Therefore, at the time when the estimated water level $\hat{h}_{k+1}$ at the moment (k+1) is estimated, the value $QI_k$ necessary for the estimation will have been detected. Accordingly, the calculation of the estimated water level $\hat{h}_{k+1}$ is possible.

The initial value $\hat{h}_o$ of the estimated water level $\hat{h}_k$ is usually set to the water level $H_o$ which is measured at a moment k=0.

The circuits 51, 52, 53 and 6 are mentioned below in further detail in conjunction with FIGS. 2, 3, 4 and 5.

Figure 2:
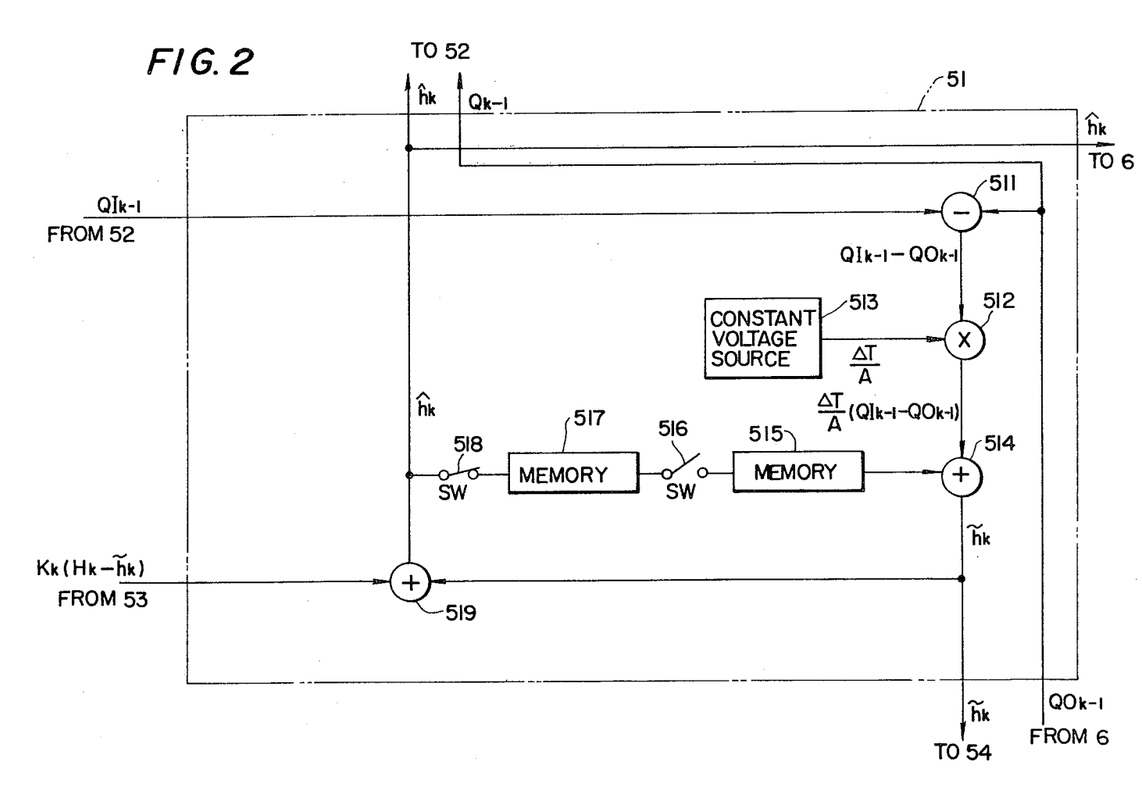
FIG. 2 is a diagram schematically illustrating a water-level prediction circuit of FIG. 1.

FIG. 2 is a diagram for concretely illustrating the water level prediction circuit.

A subtractor 511 detects a difference $$QI_{k-1} - QO_{k-1}$$

between the output $QI_{k-1}$ and the output $QO_{k-1}$ of the circuits 52 and 6. A constant voltage source 52 has been so set that the output voltage of a constant voltage source 513 corresponds to $\Delta T/A$. A multiplier 512 multiplies the output of the subtractor 511 by the output of the constant voltage source 513 to detect $\Delta T/A(QI_{k-1} - QO_{k-1})$. An adder 514 adds the output of the multiplier 512 and the estimated water level $\hat{h}_{k-1}$ corresponding to the stored amount of water at the moment k−1 stored in a memory 515, thereby to detect $$\tilde{h}_k = \frac{\Delta T}{A}(QI_{k-1} - QO_{k-1}) + \hat{h}_{k-1}$$

This corresponds to the sum of the first term and the second term of the above equation (1). The value $\tilde{h}_k$ is supplied to a subtractor 54.

An adder 519 adds an output $K_k(H_k - \tilde{h}_k)$ of the circuit 53 corresponding to the third term of the equation (1) and the value $\tilde{h}_k$ to detect the estimated water level $\hat{h}_k$ of the equation (1). The value $\hat{h}_k$ is supplied to the circuits 52 and 6.

A switch 518 is closed only at a moment $n\Delta T$ ($\Delta T$ denotes a time interval of filtering time, and n denotes an integer). Hence, a memory 517 stores the estimated water level $\hat{h}_k$. A switch 516 closes only just before a moment $(n+1)\Delta T$. Accordingly, the memory 515 stores the estimated water level $\hat{h}_{k-1}$ at the moment k−1 which is earlier than the present moment k by a filtering time interval. However, a value corresponding to the actually measured water level $H_o$ with the initial value being $\hat{h}_o$ at the moment K=0, has been stored in the memory 515.

The value $QO_{k-1}$ is supplied to the circuit 52.

Figure 3:
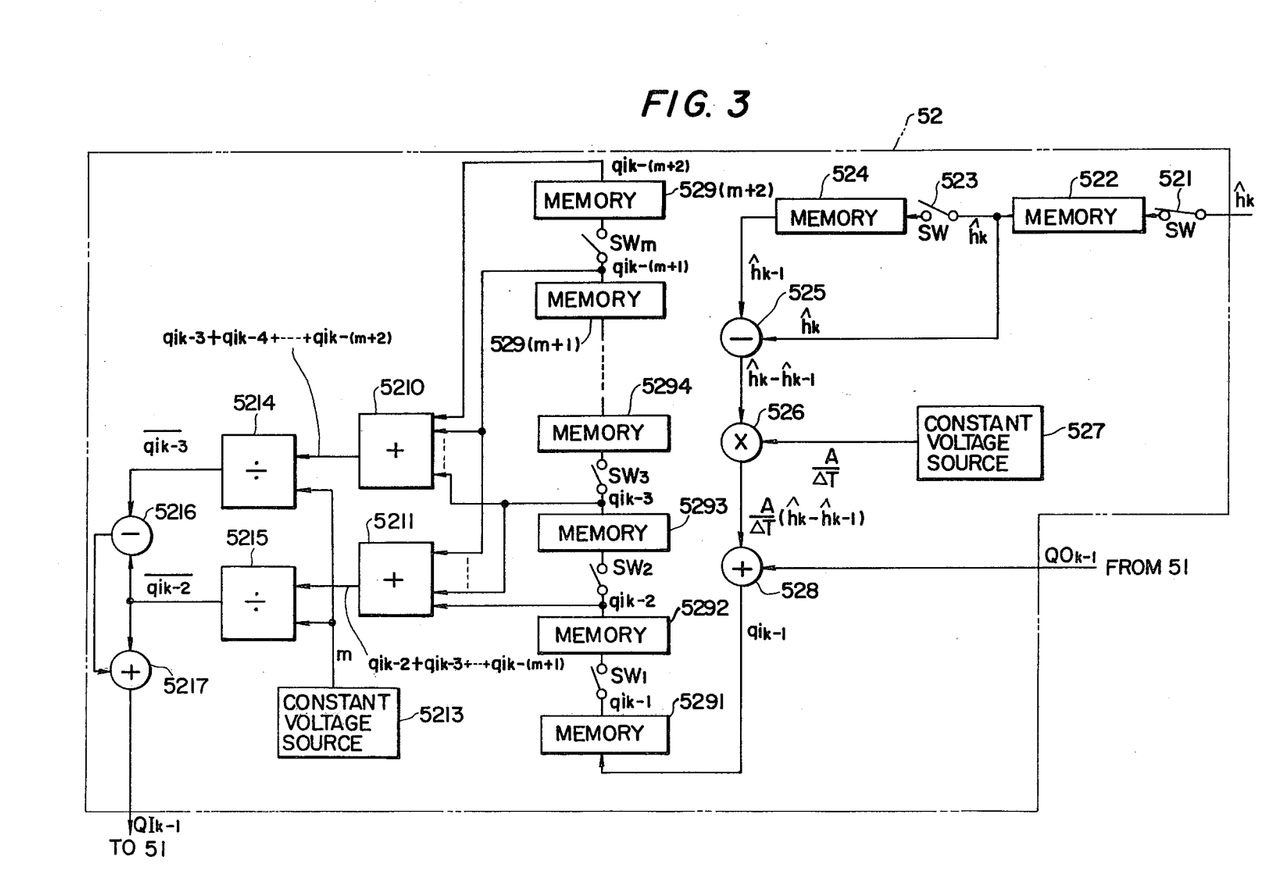
FIG. 3 is a diagram schematically illustrating an inflow prediction circuit of FIG. 1.

FIG. 3 is a diagram concretely illustrating the inflow prediction circuit.

A switch 521 closes only at the moment $n\Delta T$, and a memory 522 stores the estimated water level $\hat{h}_k$. A switch 523 closes only just before the moment $(n+1)\Delta T$, and a memory 524 stores the estimated water level $\hat{h}_{k-1}$. A subtractor 525 detects a difference $\hat{h}_k - \hat{h}_{k-1}$ between the outputs of the memories 522 and 524. A constant voltage source 527 has been so set that its output voltage is $A/\Delta T$. A multiplier 526 multiplies the output of a subtractor 525 by the output of the constant voltage source 527, and produces an output $A/\Delta T(\hat{h}_k - \hat{h}_{k-1})$. An adder 528 adds the output of the multiplier 526 and the output $QO_{k-1}$ of the circuit 51 to detect $$qi_{k-1} = \frac{A}{\Delta T}(\hat{h}_k - \hat{h}_{k-1}) + QO_{k-1}$$

The above relation corresponds to the aforementioned equation (2). Switches SW1, SW2,—SWm close only just before the moment $(n+1)\Delta T$. Hence, information stored in the memories 5291, 5292,—, 529(m+1) is successively shifted after every time interval $\Delta T$. At the moment k, therefore, the memories 5291, 5292, 5293,—, 529(m+1), 529(m+2) store $qi_{k-1}$, $qi_{k-2}$, $qi_{k-3}$,—, $qi_{k-(m+1)}$, $qi_{K-(m+2)}$.

An adder 5211 detects $$qi_{k-2} + qi_{k-3} + \cdots + qi_{k-(m+1)}$$

An adder 5210 finds $$qi_{k-3} + qi_{k-4} + \cdots + qi_{k-(m+2)}$$

A constant voltage source 5213 has been so set that its output voltage is m. A divider 5214 divdes the output of the adder 5210 by the output m of the constant voltage source 5213 to detect $$\overline{qi_{k-3}} = \frac{qi_{k-3} + qi_{k-4} + \cdots + qi_{k-(m+2)}}{m}$$

which corresponds to the aforementioned equation (3). Similarly, a divider 5215 detects $$\overline{qi_{k-2}} = \frac{qi_{k-2} + qi_{k-3} + \cdots + qi_{k-(m+1)}}{m}$$

A subtractor 5216 detects a difference $qi_{k-2} - qi_{k-3}$ between the outputs of the subtractors 5215 and 5214. An adder 5217 adds the output of the divider 5215 and the output of the subtractor 5216 to detect $$QI_{k-1} = \overline{qi_{k-2}} + (\overline{qi_{k-2}} - \overline{qi_{k-3}})$$

which corresponds to the aforementioned equation (4), and supplies an output to the circuit 51.

Figure 4:
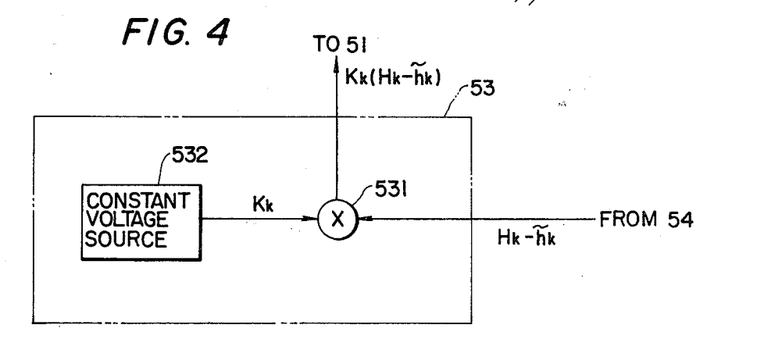
FIG. 4 is a diagram schematically illustrating an estimation error correction circuit of FIG. 1.

FIG. 3 is a diagram which concretely illustrates the estimation error correction circuit 53.

A constant voltage source 532 is so set that its output voltage is $K_k$. In this case, the output voltage $K_k$ remains constant and does not change. A multiplier 531 multiplies the output $H_k - \tilde{h}_k$ of the subtractor 54 by the output $K_k$ of the constant voltage source 532, and supplies an output $K_k(H_k - \tilde{h}_k)$ to the circuit 51.

Here, the setpoint value $K_k$ is detected as mentioned below. If a true value of the water level from which is removed noise is denoted by $h_k$, a transition equation related to the water level is given by $$h_k = h_{k-1} + \frac{\Delta T}{A}(QI_{k-1} - QO_{k-1}) + U_{k-1}$$

where $U_k$ represents noise given by a white random series.

The relation for practically measuring the water level $H_k$ is given by $H_k = h_k + W_k$, where $W_k$ is noise given by a white random series.

Symbols $U_k$ and $W_k$ denotes quantities which statistically change, and their distributions $\delta^2$ are represented by $U_k$ and $W_k$, respectively.

The distribution $W_k$ is estimated in the following way. An average amplitude a of the water-level fluctuation from the moment k to a past time $T_1$ is found from the practically measured data $H_k$, $H_{k-1}$, $-H_{k-T_1}$, and the distribution is set to be $W_k = (0.6a)^2$.

The distribution $U_k$ is assumed to be 100 times, 25 times, 4 times and 1 times of $W_k$, and an estimated value $\tilde{h}_k$ based upon $U_k$ and $W_k$ is compared with the actual water level. Then, $U_k$ is set to a value which is best suited for removing the noise.

By using the thus detected values $U_0$, $-U_k$, $W_0$, $W_1$, $-W_k$, $W_0$ is set to a suitable initial value, and a value $K_k$ is successively found by way of the following three relations.

$$K_k = P_k W_k^{-1}$$

$$P_k = (M_k^{-1} + W_k^{-1})^{-1}$$

$$M_k = P_{k-1} + U_{k-1}$$

Thus, the correction gain $K_k$ can be found for each of the moments. According to the experiments, however, $U_0$, $U_1$, $-U_k$, $W_0$, $W_1$, $-W_k$ remain nearly constant. Therefore, the value of correction gain $K_k$ remains approximately constant irrespective of the moment k. The inventors therefore attempted to employ a constant voltage source 532 which produces a constant correction gain $K_k$ at the moment k for the circuit 53.

Figure 5:
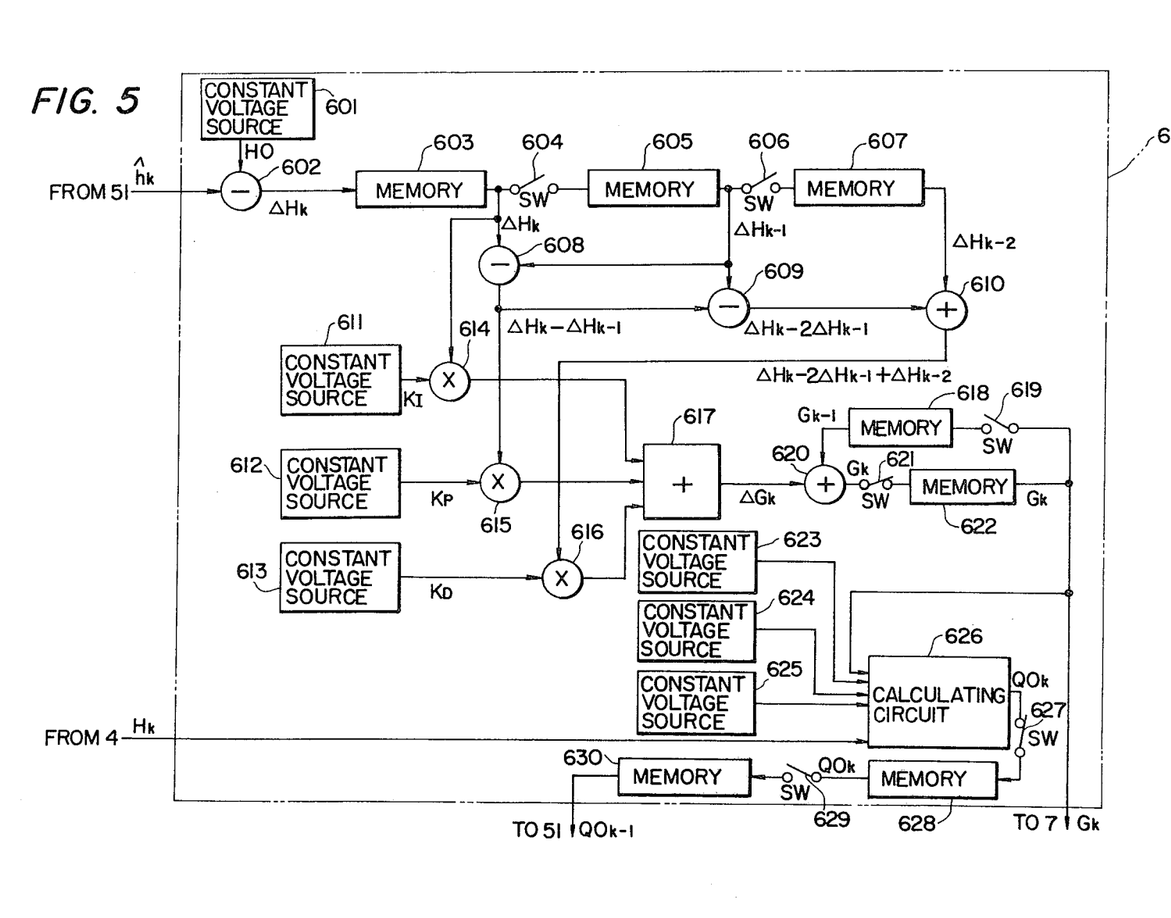
FIG. 5 is a diagram schematically illustrating a gate control circuit of FIG. 1.

FIG. 5 is a diagram for concretely illustrating the gate control circuit.

A constant voltage source 601 has been so set that the output voltage will be a desired water level HO. A subtractor 602 detects a difference $H_k = HO - \tilde{h}_k$ between an output HO of the constant voltage source 601 and an output $h_k$ of the circuit 51. A memory 603, a switch 604, a memory 605, a switch 606 and a memory 607 are connected in series. The switches 604 and 606 close only just before the moment $n\Delta T$. Hence, memories 603, 605 and 607 store values $\Delta H_k$, $\Delta H_{k-1}$ and $\Delta H_{k-2}$ at the moment k.

Constant voltage sources 611, 612 and 613 are so set that their output voltages are denoted by $K_I$, $K_P$ and $K_D$, where $K_I$ denote an integration control constant of the gate, $K_P$ denote a proportional control constant of the gate, and $K_D$ denote a differential control constant of the gate. A subtractor 608 detects a difference $\Delta H_k - \Delta H_{k-1}$ between the output of the memory 603 and 604. A subtractor 609 detects a difference $\Delta H_k - 2\Delta H_{k-1}$ between the output of the subtractor 608 and the output of the memory 605. An adder 610 detects an addition $\Delta H_k - 2\Delta H_{k-1} + \Delta H_{k-2}$ of the output of the subtractor 609 and the output of the memory 610.

Multipliers 614, 615 and 616 detect $$K_I \Delta H_k$$

$$K_P(\Delta H_k - \Delta H_{k-1}), \text{ and}$$

$$K_D(\Delta H_k - 2\Delta H_{k-1} + \Delta H_{k-2}), \text{ respectively.}$$

An adder 617 detects a sum of the outputs of the multipliers 614, 615 and 616, i.e., $$\Delta G_k = K_I \Delta H_k + K_P(\Delta H_k - \Delta H_{k-1}) +$$

$$K_D(\Delta H_k - 2\Delta H_{k-1} + \Delta H_{k-2})$$

which symbol $\Delta G_k$ denotes a value for correcting the opening degree of the gate. An adder 620 detects a sum of an output $G_{k-1}$ of a memory 618 and an output of the adder 617, i.e., $G_k = G_{k-1} + \Delta G_k$. A switch 621 is closed at the moment $n\Delta T$ only, and a switch 619 is closed only just before a moment $(n+1)\Delta T$. At the moment k, therefore, memories 622 and 618 store values $G_k$ and $G_{k-1}$. The output $G_k$ of the memory 622 is supplied to the gate actuator 7. The PID control based on the circuit setup 601 to 622 mentioned above, pertains to a widely known art.

Constant voltage sources 623, 624 and 625 have been so set that their output voltages will be 2g, $C_L$ and $H_G$, where symbol g denotes acceleration by gravity, $C_L$ denotes a gate width and flow rate coefficient, and $H_G$ denotes a height corresponding to the crest portion of the gate. A calculating circuit 626 detects $QO_k = C_L G_k \sqrt{2g(H_k - H_G)}$ based upon the output $G_k$ of memory 622, output $H_k$ of water gauge 4, and outputs 2g, $C_L$ and $H_G$ of constant voltage sources 623, 624 and 625. A switch 627 closes only at the moment $n\Delta T$. A switch 629 closes only just before the moment $n\Delta T$. Therefore, the memories 628 and 630 store the flow rates $QO_k$ and $QO_{k-1}$, respectively. The output $QO_{k-1}$ of the memory 630 is supplied to the circuit 51.

Figure 6:
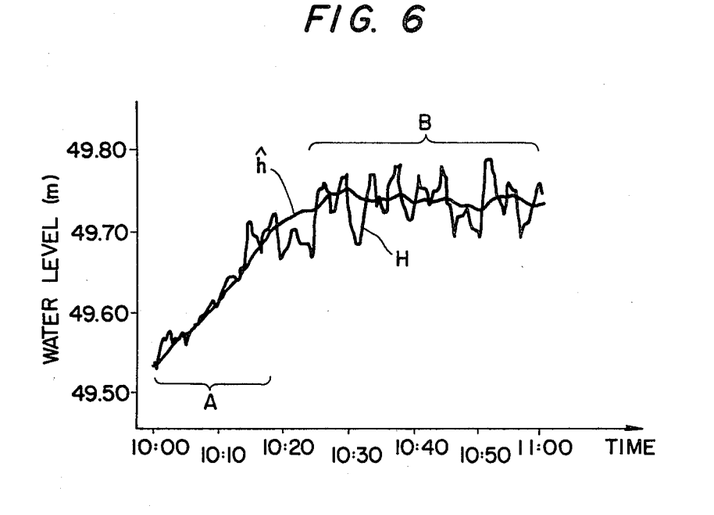
FIG. 6 is a diagram illustrating the change in the estimated value $\hat{h}$ of water level according to the present invention and the actual water level H.
Figure 7:
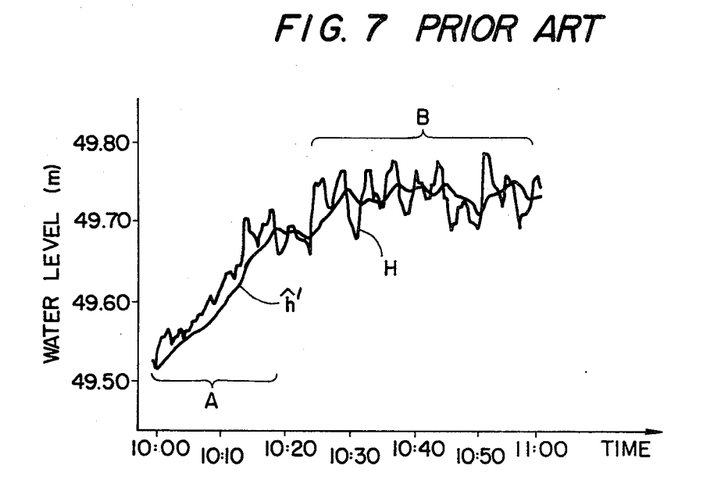
FIG. 7 is a diagram illustrating the change in the estimated value $\hat{h}'$ of water level according to a conventional system and the actual water level H.

The effects of the invention are mentioned below with reference to FIGS. 6 to 9. All of these drawings show the results of simulation test. First, FIGS. 6 and 7 show the change in estimated water level $\hat{h}$ that serves as a predicted value for controlling the water level and the actual water level H with respect to the time. FIG. 6 shows the case when the present invention is adopted, and FIG. 7 shows the case when the running average method is adopted in which the estimated water level $\hat{h}'$ is detected from the average value of ten actual water levels H that were measured periodically in the past maintaining a time interval of 30 seconds.

As will be obvious from the drawings, with reference to the portion A where the water level greatly varies, the estimated water level $\hat{h}$ of FIG. 6 which is the present invention follows the change in the actual water level H with less delay than that of FIG. 7. With reference to the portion B where large change in the water level is ceased, the estimated water level $\hat{h}$ of FIG. 6 remains relatively stable irrespective of fluctuating water level H, whereas the estimated water level $\hat{h}'$ of FIG. 7 is greatly affected by the change in the actual water level H. In either case, it will be recognized that the control system of the present invention exhibits excellent stability.

Figure 8:
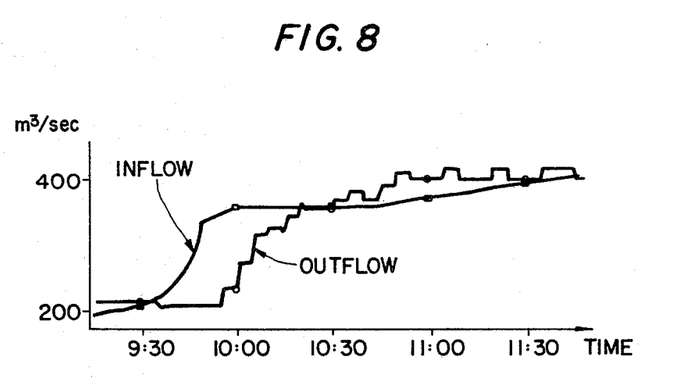
FIG. 8 is a diagram illustrating the change in the outlfow rate with respect to the inflow rate according to the present invention.
Figure 9:
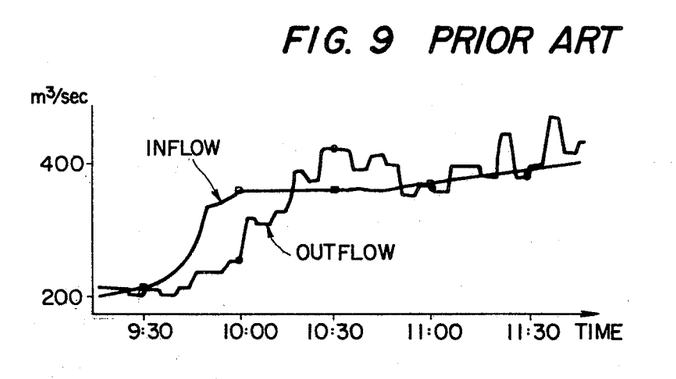
FIG. 9 is a diagram illustrating the change in the outflow rate with respect to the inflow rate according to the conventional system.

FIGS. 8 and 9 illustrate the changes in outflow rate with respect to the change in inflow rate, that are assumed from the past data. FIG. 8 shows the case according to the present invention, and FIG. 9 shows the case when the change in the actual water level is running-averaged, and the opening degree of the gate is controlled by the average value. As will be obvious, the outflow rate of FIG. 9 varies suddenly and greatly as compared with that of FIG. 8. Such a great change in the outflow rate causes the water level to be further varied giving rise to the occurrence of overflow even if the stored amount of water is not so great.

According to the present invention as illustrated in the foregoing, it is allowed to stably control the reservoir.

Here, it is also possible to set up the filter 5 and the gate control circuit 6 using a single computer.

What is claimed is:

1. A method for controlling the water level of a reservoir comprising the steps of:

a first step of determining the actual water level, the inflow rate and the outflow rate of the reservoir at each of a plurality of successive predetermined moments of time;

a second step of determining an estimated water level corresponding to a stored amount of water in the reservoir at each of said predetermined moments of time; and a third step of controlling the outflow rate from each of said successive moments of time until the next moment of time based upon the estimated water level and a target water level for each moment of time; and wherein said second step includes determining the estimated water level corresponding to the stored amount of water at a given moment of time, based upon a change of the amount of water stored in the reservoir from the previous moment of time next preceding said given moment of time until said given moment of time, on the basis of said estimated water level determined at the previous moment of time, and further based upon a correction amount which is proportional to the difference between the sum of said change and said estimated water level at the previous moment of time and the actual water level detected at said given moment of time;

said change in the amount of water stored in the reservoir being detected from the difference between the inflow rate and the outflow rate at the previous moment of time and the water surface area of the reservoir.

2. A water level control system for a reservoir according to claim 1, wherein the operation for controlling the outflow rate in said third step includes controlling the opening degree of a gate of the reservoir.

3. A water level control system for a reservoir according to claim 2, wherein the outflow rate at each of said moments of time is detected upon the opening degree of the gate and the actual water level at each of said moments of time.

4. A water level control system for a reservoir according to claim 1, wherein the outflow rate at each of said moments of time is detected based upon the outflow rate of the previous moment of time, and based upon the difference between the estimated water level at each of said moments of time and the estimated water level of each previous moment of time.

5. A water level control system for a reservoir according to claim 1, wherein the inflow rate at each of said moments of time is detected by measuring the instantaneous value of the inflow rate of the previous moment of time based upon the outflow rate of each previous moment of time and the difference between the estimated water level at each of said moments of time and the estimated water level of each previous moment of time, by detecting the average values of said instantaneous values from each of said moments of time to said plurality of previous moments of time, and by detecting the inflow rate at each of said moments of time based upon the average value detected at the previous moment of time.

6. A water level control system for a reservoir having a gate for controlling the water outflow rate therefrom comprising;

first means for detecting the actual water level in the reservoir at successive moments of time;

second means coupled to said first means for calculating an estimated water level corresponding to the stored amount of water in the reservoir;

third means coupled to said first and second means for determining the opening degree of said gate based upon the difference between said estimated water level and a preset target water level, and for detecting an outflow rate based upon said opening degree of the gate and said detected actual water level; and fourth means coupled to said third means for driving the gate responsive to an output of said third means for opening the gate;

wherein said second means includes:

means for estimating an inflow rate based upon said estimated water level and the outflow rate;

water level estimating means for determining the sum of said estimated water level at the previous moment of time and a value corresponding to the change of the stored amount of water in the reservoir calculated from the difference between said inflow rate and outflow rate at a previous moment of time;

subtractor means for obtaining the difference between said sum and said detected actual water level; and means for producing an error correction value by multiplying said difference and a predetermined proportional constant;

and wherein said water level estimating means detects said estimated water level at the present moment of time, by adding said sum and said error correction value.

7. A water level control system for a reservoir according to claim 6, wherein said second means and said third means are formed by a single computer.

8. A method for controlling the water level of a reservoir comprising the steps of:

detecting the actual water level ($H_k$) at a predetermined time (k), said actuator water level being influenced by not only the difference between the inflow rate of the reservoir and the outflow rate from the reservoir, but also water level noise caused by the opening and closing of a gate and by a sudden change in the inflow rate;

deriving the estimated water level ($\hat{h}_k$) corresponding to a stored amount of water in the reservoir which is not influenced by the above-mentioned water level noise at said predetermined time (k) from the outflow rate ($QO_{k-1}$) of the water at a previous time (k−1) out of the reservoir, the inflow rate ($QI_{k-1}$) of the water at the previous time (k−1) into the reservoir, and an estimated water level ($\hat{h}_{k-1}$) at the previous time (k−1);

determining the outflow rate ($QO_k$) of the water at the time (k) out of the reservoir from said actual water level ($H_k$) measured at the time (k) and the estimated water level ($\hat{h}_k$);

deriving the inflow rate ($QI_k$) of the water at the time (k) into the reservoir from said estimated water levels ($\hat{h}_k$) and ($\hat{h}_{k-1}$) at said predeterminated time (k) and at said previous time (k−1) and the outflow rate ($QO_{k-1}$) at the previous time (k−1); and controlling the gate of the reservoir in accordance with the estimated water level ($\hat{h}_k$).

9. A control method of claim 8, wherein the estimated water level ($\hat{h}_k$) is obtained from the following relationship, $$\hat{h}_k = \hat{h}_{k-1} + \frac{1}{A}(QI_{k-1} - QO_{k-1})T +$$

-continued $$K_k\left[H_k - \hat{h}_{k-1} + \frac{1}{A}(QI_{k-1} - QO_{k-1})T\right]$$

where,

A: water surface area of the reservoir
$QI_{k-1}$: inflow rate at the time (k−1)
$QO_{k-1}$: outflow rate at the time (k−1)
T: time interval from the time (k−1) to the time (k)
$H_k$: actual water level at the time (k)
$K_k$: estimated error correction gain at time (k).

10. A control method of claim 8, wherein the outflow rate ($QO_k$) of the water at the time (k) is determined from the following relationships:

$$QI_k = \bar{q}i_{k-1} + (\bar{q}i_{k-1} - \bar{q}i_{k-2})$$

$$\bar{q}i_{k-1} = \sum_{j=k-m}^{k=1} qi_j/m$$

$$\bar{q}i_{k-1} = \frac{1}{T}(\hat{h}_k - \hat{h}_{k-1})A + QO_{k-1}$$

where $qi_{k-1}$ is the instantaneous value of the inflow rate at the time (k−1), A is the water surface area of the reservoir, and T is the time interval from the time (k−1) to the stored time (k).

11. A method for controlling a water level of a reservoir comprising the steps of:

detecting the actual water level ($H_k$) at a predetermined time (k), said actual water level being influenced by not only the difference between the inflow rate from the reservoir and the outflow rate from the reservoir but also water level noise caused by the opening and closing of a gate and by sudden change in the inflow rate;

determining the inflow rate ($QI_{k-1}$) and the outflow rate ($QO_{k-1}$) at a preceding time (k−1);

calculating an estimated water level $\hat{h}_k$ at said time (k) including no water level noise, on the basis of said actual water level ($H_k$) at the time (k) and said inflow rate ($QI_{k-1}$) and outflow rate ($QO_{k-1}$) at the preceding time (k−1); and controlling the gate of the reservoir in accordance with the estimated water level ($\hat{h}_k$).

12. A system for controlling the water level of a reservoir comprising:

first means for detecting the actual water level ($H_k$) at a predetermined time (k), said actual water level being influenced by not only the difference between the inflow rate to the reservoir and the outflow rate from the reservoir but also water level noise caused by the opening and closing of a gate and by a sudden change in the inflow rate;

second means for deriving the estimated water level ($\hat{h}_k$) corresponding to a stored amount of water in the reservoir which is not influenced by the above-mentioned water level noise at said predetermined time (k) from the outflow rate ($QO_{k-1}$) of the water at a previous time (k−1) out of the reservoir, the inflow rate ($QI_{k-1}$) of the water at the previous time (k−1) into the reservoir and an estimated water level ($\hat{h}_{k-1}$) at the previous time (k−1);

determining the outflow rate ($QO_k$) of the water at the time (k) out of the reservoir from said actual water level ($H_k$) measured at the time (k) and the estimated water level ($\hat{h}_k$);

fourth means for deriving the inflow rate ($QI_k$) of the water at the time (k) into the reservoir from said estimated water levels ($\hat{h}_k$) and ($\hat{h}_{k-1}$) at said predetermined time (k) and at said previous time (k−1) and the outflow rate ($QO_{k-1}$) at the previous time (k−1); and fifth means for controlling the gate of the reservoir in accordance with the estimated water level ($\hat{h}_k$).

13. A system according to claim 12, wherein said second means includes subtractor means for subtracting the outflow rate ($QO_{k-1}$) from the inflow rate ($QI_{k-1}$), means for multiplying the output of said subtractor by a factor $\Delta T/A$ (where $\Delta T$ is the period of time between the time k−1 and the time k), first adder means for adding to the output of said multiplying means the previous estimated water level ($\hat{h}_{k-1}$) and second adder means for adding to the output of said first adder means an estimated error correction value.

14. A system according to claim 13, wherein said second means further includes memory means for storing the output of said second adder means for use as the estimated water level value at the time (k+1).

15. A system according to claim 13, further including additional subtractor means for subtracting the output of said first adder means from the output ($H_k$) of said first means and additional multiplier means for multiplying the output of said additional subtractor means by an error correction coefficient $K_k$ to produce said estimated error correction value supplied to said second adder means.

* * * * *